United States Patent [19]

Deem et al.

[11] 3,880,798

[45] Apr. 29, 1975

[54] FLUOROCARBON COMPOUNDS

[75] Inventors: William Roy Deem, Runcorn; Keith Ogden, Thornton-Cleveleys, England

[73] Assignee: Imperial Chemical Industries Limited, London, England

[22] Filed: Apr. 20, 1973

[21] Appl. No.: 352,988

[52] U.S. Cl. ............ 260/42.16; 117/127; 117/142; 117/154; 260/42.18; 260/42.22; 260/42.25; 260/42.27; 260/42.55; 260/501.11; 260/501.12; 260/509; 260/521; 260/944
[51] Int. Cl. .............................................. C08f 45/04
[58] Field of Search .. 260/29.6 EM, 41, 944, 42.27, 260/42.55, 42.16; 106/308 Q

[56] References Cited
UNITED STATES PATENTS
2,559,749   7/1951   Benning ...................... 260/296 MP
2,782,179   2/1957   Lontz ................................... 260/41
2,782,180   2/1957   Weidman ............................. 260/41
3,758,618   9/1973   Deem ............................ 260/653.1

Primary Examiner—James H. Derrington
Attorney, Agent, or Firm—Cushman, Darby & Cushman

[57] ABSTRACT

Surface active derivatives of the TFE oligomers containing a fluorocarbon group of formula $C_{2n}F_{4n-1}$ and a phosphate group $OPO_3M_2$ (wherein M is hydrogen, alkali metal, ammonium or alkyl ammonium) are used in the preparation of composites with granular PTFE with fillers such as glass and metal.

4 Claims, No Drawings

FLUOROCARBON COMPOUNDS

This invention relates to chemical compounds containing perfluorocarbon groups.

According to the present invention there is provided a novel surface-active compound of formula

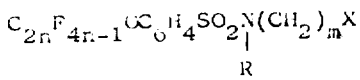

wherein
- $n$ is 4, 5 or 6
- R is an alkyl group containing from one to five carbon atoms or is hydrogen
- $m$ is an integer from one to six
- X is $-SO_3M$, $COOM$, or $OPO_3M_2$ wherein
M is hydrogen, alkali metal, ammonium or alkyl substituted ammonium.

The group R is preferably a methyl or ethyl group and $m$ is preferably a small integer less than four; especially preferred are the range of compounds wherein $m$ is equal to 2.

The perfluoroalkenyl group $C_{2n}F_{4n-1}$ may be a straight-chain group but is preferably a branched group derived from an oligomer of tetrafluoroethylene $C_{2n}F_{4n}$.

The $C_6H_4$ group is a disubstituted phenylene group wherein the two substituents may be ortho, meta or para but are preferably in the para positions on the phenylene ring.

The compounds of the present invention may be made conveniently from the sulphonic acid or sulphonyl chloride derivative of the phenyl ether derivative of a perfluoroolefine $C_{2n}F_{4n-1}OC_6H_4$. Such derivatives have been disclosed in our U.K. Pat. Specifications Nos. 1,130,822 and 1,270,662.

A preferred method of preparation is by means of a reaction between $C_{2n}F_{4n-1}OC_6H_4SO_2Cl$ and a compound of formula $RNH(CH_2)_mX$ wherein R, $m$ and X are as hereinbefore defined. The compounds $RNH(CH_2)_mX$ in which R is methyl or ethyl, $m$ is one or two and X is $SO_3M$ or $COOM$ may be readily purchased and thus the reaction products of those compounds with the fluorocarbon sulphonyl chloride constitute the cheapest forms of the invention having general activity as surface-active and surface treatment compounds.

The preferred method of preparation of the compounds in which X is $OPO_3M_2$ is by the action of a phosphorus oxyhalide (for example phosphorus oxychloride) or phosphorous pentoxide on an alcohol having the structure

wherein
$n$, $m$ and R are as hereinbefore defined.

The compounds of the invention are powerful surface-active agents by reason of the terminal oleophobic and hydrophobic perfluorocarbon group and the hydrophilic anionic group at the opposite end of the molecule. Thus they may be used for many of the uses of fluorocarbon surface-active agents which have been disclosed for example in U.K. Pat. Specification No. 1,296,676.

Thus they may be used as oil repellent coatings for porous surfaces especially to prevent the soiling and staining of paper, leather and textiles by oils, greases, waxes and foodstuffs commonly encountered in domestic and industrial usage.

The compounds of this invention also have application as mould release agents especially for the moulding of organic polymeric materials for example polyolefines and polyurethanes. Very small amounts of the compound are effective and it has been observed that they are superior to other mould release agents in that moulded articles may be painted satisfactorily as they come from the mould without further washing or other cleaning of the surface.

Another use of these compounds herein described is in the treatment of metal against corrosion for example the rusting of steel is deterred when the steel is coated with a composition containing any one or more of the compounds of this invention.

Surface active compounds containing a phosphate group $OPO_3M_2$ as above defined linked to a fluorocarbon group $C_{2n}H_{4n-1}$ where $n = 4$, 5 or 6 may be used for the treatment of fillers e.g. glass fillers in the manufacture of filled granular grades of fluorocarbon polymers. In this, the filler and polymer are agglomerated together from an aqueous medium. The group linking the phosphate and the fluorocarbon groups should be such as to allow each of the phosphate and fluorocarbon groups to exert its required function, namely that the fluorocarbon group should exhibit hydrophobising properties and the phosphate group should attach the molecule to the filler sufficiently strongly to withstand a wash agglomeration process.

Preferably the filler is treated with a solution of the derivative in an organic solvent to coat the filler with the derivative and make it hydrophobic prior to agglomerating it with the fluorocarbon polymer from an aqueous medium. Compounds of this invention containing a phosphate group $OPO_3M_2$ may be used for this purpose and a particularly useful surface active compound has been found to be one of the formula

The formation of relatively small size agglomerates of a fluorocarbon polymer and filler is important in moulding technology as it enables free-flowing filled particles to be formed from poorly flowing polymer. The particles can be more readily handled than unagglomerated polymer and filler e.g. in automatic moulding machinery.

By making the filler particles hydrophobic with a surfactant which will withstand the washing conditions experienced in agglomeration from an aqueous medium, as further described below, the successful agglomeration of polymer and filler is facilitated. In practical terms this means that a substantial proportion of the filler charged to the wash vessel will, under suitable conditions, be agglomerated with the fluorocarbon polymer. Thus waste of filler will be minimised and the composition of the agglomerated product will be predictable from the relative amounts of polymer and filler charged. It has thus proved a valuable discovery that surface active compounds as described above can be used to treat fillers successfully in this agglomeration method.

Fluorocarbon polymers in granular form are made by methods well known in the art for example by polymerising monomer in an aqueous medium in the absence of a stabilising amount of emulsifying agent. The polymer recovered is usually comminuted, e.g. by milling before a filler is incorporated into it. The fluorocarbon polymers include granular grades of polytetrafluoroethylene (PTFE) and copolymers of tetrafluoroethylene with up to 15% by weight of other monomers such as ethylene, vinyl chloride and hexafluoropropene.

The fillers that may be treated prior to incorporation into the fluorocarbon polymer in addition to glass include coke, metallic fillers such as aluminium, bronze, copper, nickel and iron and mineral fillers such as asbestos, mica, silica, titanium dioxide and talc. In an agglomeration from an aqueous medium there is generally no need to treat fillers which are already hydrophobic e.g. graphite to assist in their agglomeration with the polymer.

In carrying out an agglomeration from an aqueous medium the granular polymer and filler, both in fine particle form, the filler having been treated with the fluorocarbon derivative, may be charged to a washing vessel in which they are agitated with water by suitable stirring means until agglomerates of a suitable size and containing both the polymer and filler are formed. The agglomerates are subsequently recovered from the vessel and dried. A suitable agitation period is from 2 to 4 hours at 60° to 90°C. Milled granular PTFE of 20–25μm mean particle size is a suitable form of polymer to use e.g. with finely divided glass fibre.

The compounds of the present invention are also useful in hypochlorite bleach compositions because they impart an improved wetting and spreading effect to the bleach solution, and are stable in this solution for long periods of time.

The invention is illustrated but in no way limited by the following examples:

EXAMPLE 1

Tetrafluoroethylene pentamer oxybenzene sulphonyl chloride (672 g) in warm (35°C) isopropyl alcohol (1400 ml) was added dropwise, with stirring over a period of 1.5 hours to 410 g of the sodium salt of N-methyl taurine at 25°C dissolved in 700 ml water. Upon complete addition the reaction was conducted a further hour at the same temperature. The pH of the solution was then adjusted to 6 by the addition of concentrated hydrochloric acid.

The product obtained was a 30% w/w solution of the sulphonic acid in isopropanol/water which could be diluted with water to any desired in-use concentration.

A 100 ml sample was removed from the above 30% w/w solution, diluted with water, acidified to pH 1 with further hydrochloric acid and mixed with ether. The ether layer was washed with water, dried and evaporated to dryness to give the solid product $C_{10}F_{19}OC_6H_4SO_2N(CH_3)CH_2CH_2SO_3H$. The percentage yield of solids based on this aliquot was 94.3% and a titration against standard sodium hydroxide indicated the percentage of sulphonic acid products to be greater than 99%.

The mass spectrum of the product showed a molecular ion at M/e = 775 corresponding to the correct empirical formula $C_{19}F_{19}H_{12}O_6NS_2$. The proton and the fluorine n.m.r. spectra showed the presence of ca. 80% of a compound with the proposed structure above and ca. 20% of the sulphonic acid $C_{10}F_{19}OC_6H_4SO_3H$.

EXAMPLE 2

A suspension of the tetrafluoroethylene pentamer oxybenzene sulphonyl chloride (67.2 g, 0.1 m), N-methyl glycine (9.7 g, 0.11 m) and triethylamine (10.1 g, 0.1 m) in isopropanol (150 ml) was refluxed for 2½ hours, cooled and the isopropanol removed in vacuo. The resultant gelatinous solid was extracted with ether, and the ether solution washed with 2N hydrochloric acid and then with water. The ether solution was dried and evaporated to yield 73 g of a gelatinous solid.

The mass spectrum of the product indicated a parent ion at M/e = 725 which corresponds to the expected empirical formula $C_{19}F_{19}H_{10}O_5NS$.

The p.m.r. and fluorine n.m.r. spectra of the product were consistent with the proposed structure of the carboxylic acid $C_{10}F_{19}OC_6H_4SO_2H(CH_3)CH_2COOH$.

EXAMPLE 3

A solution of tetrafluoroethylene pentamer oxybenzene sulphonyl chloride (670 g) in isopropyl alcohol (1400 ml) was warmed to 35°C and added dropwise with continual stirring over a period of 1.5 hours to a solution of 410 g of the sodium salt of N-methyl taurine in 700 ml of water. During this slow mixing of the two solutions the pH of the resultant mixture was maintained at 9.5 by the addition of a few drops, as required, of a 50% solution of sodium hydroxide in water. After the addition of the solutions was complete the stirring was continued for a further hour at 25°C to complete the reaction. The pH of the solution was then adjusted to a value of 2 by the addition of concentrated hydrochloric acid.

The resultant solution contained ca. 30% by weight of the sulphonic acid

$C_{10}F_{19}OC_6H_4SO_2N(CH_3) CH_2CH_2SO_3H$ which could be diluted with water to any desired in-use concentration. A 100 ml sample was removed diluted and extracted with ether. The NMR spectrum of the solid product dissolved in the ether (after drying and evaporation to dryness) was examined and observed to provide evidence that the process used in this Example gave an improved purity of product compared with that of Example 1. The maintenance of the alkaline condition in the early part of the reaction helps to prevent the formation of other unwanted sulphonic acid products.

As a result of the more complete reaction the sodium salt of the desired product was isolated from the solution of pH 9.5 (before hydrochloric acid was added to neutralise) by evaporation of the solution to dryness.

Alkyl ammonium salts of the acid were prepared by neutralising an aqueous solution with a suitable organic base; for example triethyl amine, and evaporating the solution to isolate the salt.

EXAMPLE 4

Phosphorus oxychloride (116 gms) and a solution of N-methyl tetrafluoroethylene pentamer oxybenzene sulphonamidoethyl alcohol (272 gms) in 1,1,2-trichloro-1,2,2-trifluoroethane (1000 mls) was stirred at 0° to 5°. Potassium carbonate (104 g) was added to the stirred solution slowly over a period of 4 hours. Upon complete addition the reaction mixture was left stirring at 5°C for 4 hours. The reaction mixture was filtered to remove excess carbonate and potassium chloride and give a mixture of unreacted phosphorus oxychloride, and N-methyl tetrafluoroethylene pentamer oxybenzene sulphonamidoethyl phosphoryldichloride $C_{10}F_{19}O\ C_6H_4SO_2N(CH_3)CH_2CH_2O\ P(O)\ Cl_2$ in 1,1,2-trichloro-1,2,2-trifluoroethane.

The above reaction mixture was shaken with water to produce the corresponding acids namely orthophosphoric acid $H_3PO_4$ and N-methyl-tetrafluoroethylene pentamer oxybenzenesulphonamidoethyl phosphate:

$C_{10}F_{19}C_6H_4SO_2N(CH_3)CH_2CH_2O\ P(O)(OH)_2$ by hydrolysis. The orthophosphoric acid was extracted into the upper aqueous phase whilst the fluorocarbon-containing phosphate remained in the 1,1,2-trichloro-1,2,2-trifluoroethane settling out as a lower layer. The lower layer was separated off, washed with more water, dried over magnesium sulphate and collected as a solution in 1,1,2-trichloro-1,2,2-trifluoroethane which was found to contain 220 gm of product.

Titration of an aliquot of the above solution against standard sodium hydroxide solution indicated the product to be greater than 95% pure.

An aliquot of the above solution in 1,1,2-trichloro-1,2,2-trifluoroethane was taken down to dryness to give a white solid. Analysis of this solid confirmed the formula to be:

$C_{10}F_{19}O\ C_6H_4SO_2N(CH_3)CH_2CH_2O\ P(O)(OH)_2$

The analytical results were as follows

|  |  | Found | Calculated |
|---|---|---|---|
| Percent | C | 29.1 | 28.8 |
| by weight | H | 1.7 | 1.7 |
| of each | N | 1.7 | 1.8 |
| element | P | 4.1 | 3.9 |

The p.m.r. and fluorine n.m.r. spectra of the product were also consistent with the proposed structure.

EXAMPLE 5

Phosphorus oxychloride (25 gms) and a solution of N-ethyl tetrafluoroethylene pentamer oxybenzenesulphonamidoethyl alcohol (60 gms) in 1,1,2-trichloro-1,2,2-trifluoroethane (300 mls) was stirred at 0° to 5°. Pyridine (6 gms) dissolved in the same solvent (200 ml) was added slowly to the stirred reactants. Copious white fumes formed which cleared with time and a precipitate of pyridine hydrochloride was formed. After complete addition of the pyridine the reaction mixture was left stirring at 10° for 6 hours. The reaction mixture was filtered to remove the pyridine salt and to give a mixture of unreacted phosphorus oxychloride and N-ethyl tetrafluoroethyl pentamer oxybenzenesulphonamidoethyl phosphoryldichloride $C_{10}F_{19}O$ $C_6H_4SO_2N(C_2H_5)CH_2CH_2O\ P(O)\ Cl_2$ in 1,1,2-trichloro-1,2,2-trifluoroethane. The solution mixture was shaken with water to produce the corresponding acids namely orthophosphoric acid and N-ethyl tetrafluoroethylene pentamer oxybenzenesulphonamidoethyl phosphate $C_{10}F_{19}O\ C_6H_4SO_2N(C_2H_5)CH_2CH_2O$ $P(O)\ (OH)_2$ by hydrolysis. The N-ethyl tetrafluoroethylene pentamer oxybenzenesulphonamidoethyl phosphate (50 gms) was collected as a solution in 1,1,-2-trichloro1,2,2,-trifluoroethane using the method discussed in Example 4.

Titration of an aliquot of the above solution of the product against standard sodium hydroxide solution indicated the product to be greater than 95% pure. The p.m.r. and fluorine n.m.r. spectra of the product were also consistent with the proposed structure $C_{10}F_{19}O\ C_6H_4SO_2N(C_2H_5)CH_2CH_2\ O\ P(O)\ (OH)_2$

EXAMPLE 6

Phosphorus oxychloride (31 gms) and a solution of N-propyl tetrafluoroethylene pentamer oxybenzenesulphonamidoethyl alcohol (73 gms) in 1,1,2-trichloro-1,2,2-trifluoroethane (500 ml) was stirred at 0° to 5°. Anhydrous sodium carbonate (10 gms) was added slowly to the stirred reactants. Upon complete addition of the carbonate the reaction mixture was left stirring at 10° for 5 hours. The reaction mixture was filtered to give a mixture of unreacted phosphorus oxychloride and N-propyl tetrafluoroethylene pentamer oxybenzenesulphonamidoethyl phosphorodichloride:

$C_{10}F_{19}\ C_6H_4SO_2N(C_3H_7)CH_2CH_2\ O\ P(O)\ Cl_2$ dissolved in 1,1,2-trichloro-1,2,2-trifluoroethane. The solution mixture was shaken with water to produce the corresponding acids namely orthophosphoric acid and N-propyl tetrafluoroethylene pentamer oxybenzenesulphonamidoethyl phosphate $C_{10}F_{19}O$ $C_6H_4SO_2N(C_3H_7)CH_2CH_2O\ P(O)\ (OH)_2$ by hydrolysis. The N-propyl tetrafluoroethylene pentamer oxybenzenesulphonamidoethyl phosphate (56 gms) was collected as a solution in 1,1,2-trichloro-1,2,2-trifluoroethane using the method discussed in Example 4.

Titration of an aliquot of the above solution against standard sodium hydroxide solution indicated the product to be greater than 95% pure. The p.m.r. and fluorine n.m.r. spectra of the product were also consistent with the proposed structure.

EXAMPLE 7

Salts of the acids described in Examples 4 to 6 inclusive were prepared, when required, by either a. hydrolysing the intermediate phosphochloridate product produced in solution after the solids were filtered off in the processes described in Examples 4 to 6 inclusive with an aqueous base such as sodium hydroxide, potassium hydroxide and ammonium hydroxide, or b. Neutralising the acid product with an equivalent amount of base for example sodium hydroxide solution, potassium hydroxide solution or mono, di or tri ethanol amine.

EXAMPLE 8

48 mls of a 0.3% solution of a compound made in accordance with Example 4 dissolved in 1,1,2-trifluoro 1,2,2-trichloroethane was mixed with 400 g of Owens-Corning 'Fibreglas' 709 glass fibre in a beaker. The mixture, consisting essentially of the glass fibres dampened with the solution, was dried at 120°C for 16 hours in an oven with a suitable solvent extraction system. 325 g of dried coated glass fibres were mixed with 875 g of PTFE ('Fluon' G 163 obtainable from Imperial Chemical Industries Limited). The 1.2 kg mixture was charged to a 30 litre vessel with 20 litres of water at less than 25°C. A stirrer in the vessel ran at 450 rpm while the temperature was raised to 80°C, and maintained at this temperature for 2 hours. The temperature was allowed to fall to less than 30°C, the stirrer stopped, and the slurry from the vessel discharged to a dewatering table with 400 μm openings. The product retained on the table was dried for 2 hours at 200°C, and baked for 3 hours at 280°C. The cool product was sieved through a sieve having 1000 μm openings. The product passing through the sieve was in the form of smooth glass-filled PTFE agglomerates.

EXAMPLE 9

A test piece of mild steel measuring 10 sq. cm. in area was immersed in a solution containing 11.2% by weight of the compound $C_{10}F_{19}O\ C_6H_4SO_2N(CH_3)CH_2CH_2O\ P\ O(OH)_2$ dissolved in 1, 1, 2-trichloro-1, 2,2-trifluoroethane. The test piece of steel was removed from the solution allowed to drain and dried in an oven at 100°C for 1 hour. The test piece of steel was then subjected to a spray of common slat solution for 3 days in an atmosphere at room temperature. The area of rusting on the surface of the steel was observed to be about 20% of the area. When the experiment was repeated using a similar test piece of steel without treatment with the fluorocarbon compound the area of rusting was observed to be at least 50%.

A second pair of test pieces of steel measuring 50 sq. cm. in area were taken for a corrosion test but these test pieces were already coated with a primer coat of zinc phosphate. One piece was immersed in a solution of the same fluorocarbon compound, dried as described above and subjected to the same salt spray for the same period of time (3 days). The area of rust developed after this treatment was observed to be only 5% of the area. The blank for this test rusted over 70% of its area during the 3-day period in the salt spray.

EXAMPLE 10

A mixture of N-methyl tetrafluoroethylene pentamer oxybenzenesulphonamido ethanol (43 gms) and phosphorous pentoxide (3 gms) was added to a flame-dried, nitrogen-purged flask. The heterogeneous mixture was heated at 100°–120° for 4 hours. The reaction mixture was partially dissolved in 1,1,2-trichloro-1,2,2-trifluoroethane (100 mls) and washed with water, filtered and the lower 1,1,2-trichloro-1,2,2-trifluoroethane solution layer separated off.

This solution was dried over $MgSO_4$, filtered and distilled to give the substituted ethyl phosphate (20 gms):

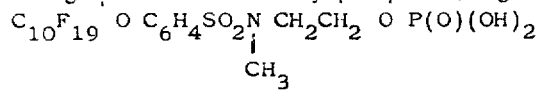

which was identified by titration with standard sodium hydroxide solution, p.m.r. and fluorine magnetic resonance spectra.

What we claim is:

1. A method of preparing a filled fluorocarbon polymer from a filler and a granular fluorocarbon polymer, both in powder form, comprising treating the filler with a surface-active compound to make it hydrophobic, agglomerating the filler together with the polymer from an aqueous medium, removing the agglomerates from the aqueous medium and drying the agglomerates, wherein the surface-active compound has the formula:

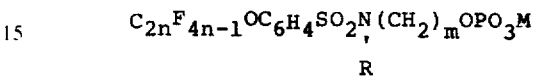

wherein
M is hydrogen, alkali metal, ammonium or alkyl-substituted ammonium,
n is 4, 5 or 6,
R is an alkyl group containing from one to five carbon atoms or hydrogen and
m is an integer from one to six.

2. A method according to claim 1 wherein the surface active compound is in accordance with the formula $C_{10}F_{19}\ O\ C_6H_4SO_2N(CH_3)CH_2CH_2\ O\ PO\ (OH)_2$.

3. A method according to claim 1 wherein the filler is treated with a solution of the surface active compound to render it hydrophobic prior to mixing and agitating it with granular polytetrafluoroethylene in an aqueous medium.

4. Filled granular polytetrafluoroethylene wherein the filler is coated with a fluorocarbon derivative having the formula:

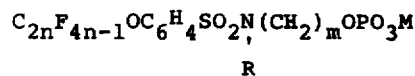

wherein
M is hydrogen, alkali metal, ammonium or alkyl-substituted ammonium,
n is 4, 5 or 6,
R is an alkyl group containing from one to five carbon atoms or hydrogen and
m is an integer from one to six.

* * * * *